Figure 1:
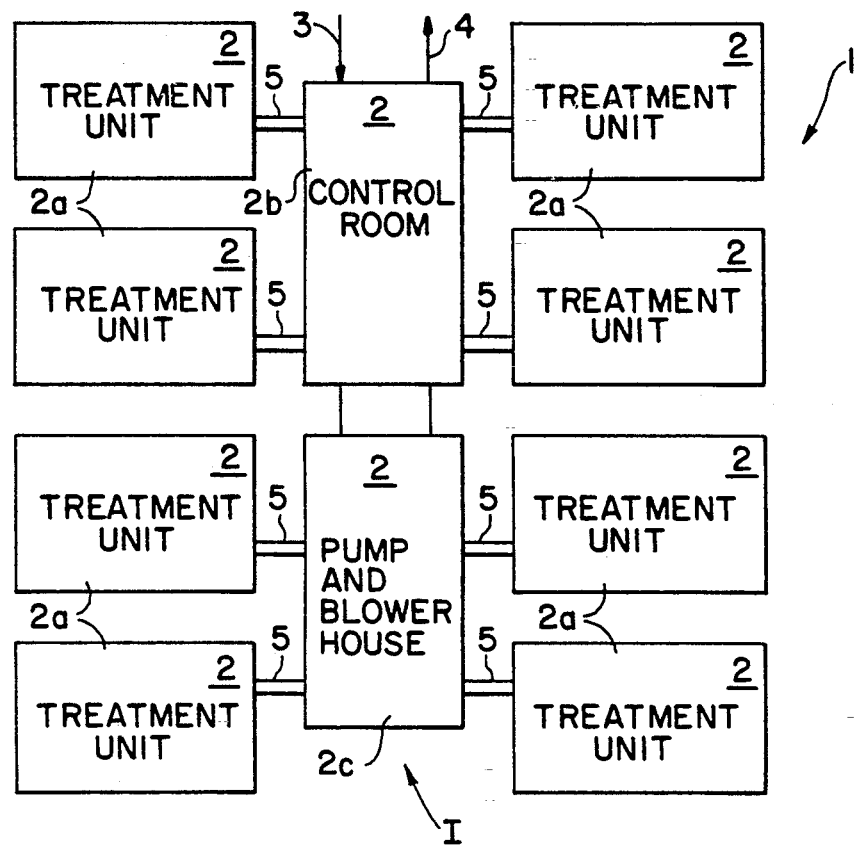

United States Patent [19]
Smith et al.

[11] Patent Number: 5,141,653
[45] Date of Patent: Aug. 25, 1992

[54] APPARATUS AND METHOD FOR TREATING A FLUID

[75] Inventors: Alan J. Smith, Hemel Hempstead; Jennifer J. Quinn, Dartford, both of Great Britain

[73] Assignee: Thames Water plc, Reading, England

[21] Appl. No.: 623,812

[22] PCT Filed: Jul. 7, 1989

[86] PCT No.: PCT/GB89/00776
§ 371 Date: Mar. 12, 1991
§ 102(e) Date: Mar. 12, 1991

[87] PCT Pub. No.: WO90/00527
PCT Pub. Date: Jan. 25, 1990

[30] Foreign Application Priority Data
Jul. 12, 1988 [GB] United Kingdom ............. 8816501

[51] Int. Cl.⁵ ............................................. E01D 21/02
[52] U.S. Cl. .................................... 210/806; 210/241; 210/258; 210/260
[58] Field of Search ............. 210/241, 171, 170, 172, 210/194, 198.1, 200–202, 207, 800, 801, 252, 804–806, 251, 258, 259, 260–262, 513

[56] References Cited

U.S. PATENT DOCUMENTS 4,536,286  8/1985  Nugent ............................. 210/241

FOREIGN PATENT DOCUMENTS 0086489  8/1983  European Pat. Off. .
2630265 10/1977  Fed. Rep. of Germany .
2742801  4/1979  Fed. Rep. of Germany .
2197648A  5/1988  United Kingdom .

Primary Examiner—Frank Sever
Attorney, Agent, or Firm—Shapiro and Shapiro

[57] ABSTRACT

An apparatus and method for on-site treatment of a fluid, such as sewage, utilize a plurality of self-contained, separately housed, and separately transporable modules (2a, 2b, 2c) for carrying out one or a sequence of treatment operations on the fluid. There is an inlet (3) whereby the apparatus is connectible with a source of the fluid to be treated and an outlet (4) from the apparatus for discharge of the treated fluid. The apparatus may be moved between different sites.

14 Claims, 1 Drawing Sheet

APPARATUS AND METHOD FOR TREATING A FLUID

The invention relates to apparatus for treating a fluid, particularly sewage.

Traditionally sewage and water treatment processes have been carried out in long life, and permanent conventional concrete tanks or structures unable to respond to changing needs for both treatment capacity and for improved effluent quality. This has meant that considerable capital investment becomes tied up in plants of obsolete design.

Furthermore such plant require large areas of land, are expensive to build and take several years to design and construct.

It is accordingly an object of the invention to avoid these disadvantages.

According to the invention there is provided apparatus for treating a fluid, comprising a housing for carrying out the treatment, characterized by the housing being incorporated with a mobile carrier for transportation and use, by there being in the housing one or more self-contained modules for carrying out one or a sequence of treatment operations on the fluid, by an inlet to the apparatus connectible to a source of fluid to be treated, by an outlet from the apparatus for fluid treated therein, and by the one module being connectible to another similar module for carrying out the fluid treatment.

The apparatus is preferably prefabricated.

The apparatus may be a sewage treatment apparatus or a water treatment apparatus.

There may be a plurality of modules, each one being mounted in a separate housing, each module being adapted for performing a separate function in the treatment process. These functions include preliminary, primary, secondary, tertiary and quaternary processes. Each module may include its own process control, electrical and pipework system. Thus, where the apparatus is for treating sewage, there may be three modules each in its own housing comprising part of a separate container which may be a vehicle, one module comprising a systems module and one comprising a sewage treatment module, the control module being connectible with a source of sewage to be treated and each module being connectible to another module as desired by suitable connectors.

The apparatus may comprise the separate modules, there being one control module, one systems module and a large number such as six or eight treatment modules.

In a system assembled from the modules, the treatment modules may be arranged in two sets or banks of four modules on either side of the other two modules. In a complex plant, there may be more than one control and one systems module. Whatever the relative positioning of the modules, they may be connected by gang ways so that the whole system can be observed and monitored by operators externally, as well as by instrumentation in the systems module.

The treatment modules may be higher than the other two modules so that the gang ways may be supported on the roofs of the other two modules and extend across any gap between them and between them and adjacent treatment modules to abut the treatment modules below the top thereof.

According to a further aspect of the invention there is provided a process of fluid treatment, comprising providing one or a plurality of transportable housing(s) and transporting the or each to a site of fluid to be treated, connecting the or each housing to a source of fluid to be treated, and treating same in the or each housing.

Apparatus embodying the invention is hereinafter described, by way of example, with reference to the accompanying drawings.

Figure 2:
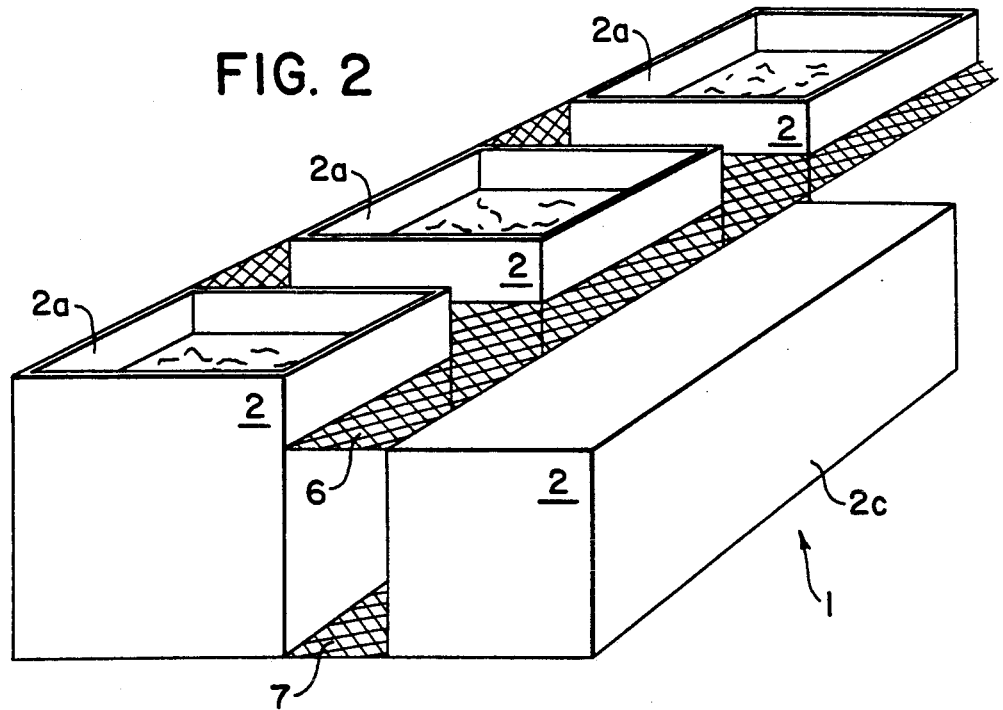

FIG. 1 shows a schematic arrangement of apparatus according to the invention for secondary treatment of sewage; and FIG. 2 is a schematic perspective view of the apparatus of FIG. 1, taken in the direction of arrow I of that figure.

Referring to the drawings, there is shown apparatus 1 for treating a fluid (specifically, for the secondary treatment of sewage), comprising a plurality of modules 2a-2c, with respective housings 2, for carrying out one or a sequence of treatment operations on the sewage. There is an inlet 3 to the apparatus connectible to a source of sewage to be treated and an outlet 4 from the apparatus for fluid treated therein.

There are, in the illustrative embodiment, ten separate modules (four of which are shown in FIG. 2), including eight treatment modules 2a, a control module 2b, and a systems module 2c. Each module is incorporated in a vehicle which is either self-propelled on a lorry or towed on a trailer or housed in a movable container. The modules are individually transportable. The modules 2a and are, more particularly, treatment modules for treating the sewage, using any suitable process. The control 2b has the inlet 3 connectible by any suitable means with a source of sewage to be treated and the outlet 4 for treated sewage. The module 2b also has a pipework system for connection with each module 2a and thus acts as a manifold whereby sewage to be treated is passe to each module 2a and from each module back to the module 2b and thence to the outlet 4. The module 2b also has a control panel (not shown) which is used to control the system. The module 2c houses motors, pumps, compressors and pneumatic or electric control systems where the treatment units include means for passing air through the sewage as part of the treatment. Each treatment module 2a is connected with modules 2b and 2c by suitable connectors such as flexible pipes 5.

The treatment modules 2a may each be housed by steel tanks, though it will be understood that plastic could be used.

In use to provide a secondary sewage treatment plant or system at a desired location, it is merely necessary to drive the modules individually to that location, to connect up the modules 2a, 2b, 2c one with another using the flexible connectors 5 after maneuvering to obtain the desired spatial arrangement of the modules, and to connect up the inlet 3 with the source of sewage. The outlet 4 is also connected up with the effluent discharge pipework/channel. When the treatment modules 2a are higher than the modules 2b and 2c gang ways 6 can be placed between them to provide walk-ways and platforms so that operators can walk round the whole of the plant externally of the modules and can observe the modules and monitor the same visually. There may be other linkage means such as a long walkway 7, to provide a more stable system.

If desired, the apparatus 1 can be disconnected and transported to a further desired location.

It will be understood that modification are possible. For example, the aerated filter modules can be replaced by any suitable secondary treatment process module. Moreover, although separate modules 2a, 2b, 2c have been disclosed for control, systems and treatment, in certain circumstances all these modules could, though separate, be collectively provided on a single vehicle for transportation to a desired sewage treatment location. Also, although the embodiment has been described with reference to the secondary treatment of sewage, the modules coupled be arranged so as to provide transportable apparatus for the apparatus described with reference to the drawing primary treatment of sewage, the tertiary treatment of sewage, or any combination of primary, secondary and tertiary sewage treatments in a single system, or for sludge treatment. Moreover, the apparatus could be used for treatment of water, as from a bore-hole, and may, for example, provide for rapid gravity, slow sand filtering, micro-straining and disinfecting treatments. In every embodiment, the provides transportability, a complete treatment process, flexibility (more or fewer modules as required) speed of installation (and dismantling), a modular system (prefabrication off-site), low cost, stand-by capability (the plant can be used to maintain treatment while a main, static plant is undergoing repair, renovation or up-dating), and a "package" plant or treatment works.

We claim:

1. Apparatus for treating a fluid, comprising
a plurality of self-contained, separately housed, transportable modules each carried on a separate mobile carrier, including at least one treatment module for carrying out a particular treatment of the fluid, a control module, and a systems module,
the control module having a first inlet for receiving raw fluid to be treated and a first outlet for discharging the treated fluid, a second inlet and a second outlet respectively connectible to an outlet and an inlet of said treatment module for exchanging the fluid from the control module to the treatment module and back to the control module, and a third inlet and a third outlet respectively connectible to an outlet and an inlet of said systems module for exchanging the fluid between the control module and said systems module,
said systems module including pump means for pumping the fluid through all of the interconnected modules,
whereby the modules are individually transportable to a site for assembly and interconnection to form an integral fluid treatment system.

2. Apparatus as defined in claim 1, including a plurality of said treatment modules on separate module carriers and which are connectible to corresponding inlets and outlets of said control module.

3. Apparatus as defined in claim 2, wherein said control module includes pipe means for interconnecting said treatment modules therethrough for carrying out a sequence of treatment operations.

4. Apparatus as defined in claim 3, wherein said treatment modules are constructed to perform sewage treatment.

5. Apparatus as defined in claim 2, wherein said treatment modules are taller than said control module and said systems module, and all of the modules are secured to one another through gangways.

6. Apparatus as defined in claim 5, wherein the gangways are disposed at the height of at least one of said control and systems modules.

7. Apparatus as defined in claim 6, wherein all of the modules are further secured by means defining a lower walkway beneath the gangways.

8. Apparatus as defined in claim 2, wherein said treatment modules are constructed to perform sewage treatment.

9. A method of effecting on-site fluid treatment at a site of a source of fluid to be treated, comprising the steps of:
transporting to the site on multiple mobile carriers a plurality of separately housed, self-contained, transportable modules including at least one treatment module for carrying out a particular treatment of the fluid, a control module having a first inlet for the raw fluid to be treated and a first outlet for discharging the treated fluid and a second inlet and a second outlet respectively connectible to an outlet and an inlet of the treatment module for exchanging the fluid from the control module to the treatment module and back to the control module, and a system module having an inlet and an outlet respectively connectible to a third outlet and a third inlet of said control module and including pump means for pumping the fluid through all of the modules when interconnected,
connecting the respective inlets and outlets of the treatment and systems modules to the corresponding outlets and inlets of the control module to form an integrated fluid treatment system, and
connecting the raw fluid inlet of said control module to the source of fluid to be treated.

10. Apparatus as defined in claim 9, wherein the treatment module performs sewage treatment.

11. A method of effecting on-site fluid treatment at a site of a source of fluid to be treated, comprising the steps of:
transporting to the site on multiple mobile carriers a plurality of separately housed, self-contained, transportable modules including a plurality of treatment modules, each for carrying out a particular treatment of the fluid, and a control module having an inlet for the raw fluid to be treated and an outlet for discharging the treated fluid and inlets and outlets corresponding to the respective treatment modules and connectible to respective outlets and inlets thereof for exchanging the fluid from the control module, to the respective treatment module and back to the control module,
connecting the inlets and outlets of the treatment to the corresponding outlets and inlets of the control module, and
connecting the raw fluid inlet of said control module to the source of fluid to be treated.

12. A method as defined in claim 11, wherein the treatment modules are interconnected through the control module for performing a sequence of treatment operations.

13. A method as defined in claim 12, wherein the treatment module performs sewage treatment.

14. A method as defined in claim 11, wherein the treatment module performs sewage treatment.

* * * * *